(12) United States Patent
Kim et al.

(10) Patent No.: US 11,872,785 B2
(45) Date of Patent: Jan. 16, 2024

(54) GLASS LAMINATES WITH IMPROVED FLATNESS AND METHODS FOR FORMING THE SAME

(71) Applicant: CORNING INCORPORATED, Corning, NY (US)

(72) Inventors: Jhee-mann Kim, Yongin-Si (KR); Goo-Soo Lee, Songpa-gu (KR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/578,556

(22) Filed: Jan. 19, 2022

(65) Prior Publication Data

US 2022/0134711 A1    May 5, 2022

Related U.S. Application Data

(63) Continuation of application No. 16/327,917, filed as application No. PCT/KR2017/009513 on Aug. 30, 2017, now Pat. No. 11,247,435.

(30) Foreign Application Priority Data

Aug. 31, 2016   (KR) ........................ 10-2016-0112061

(51) Int. Cl.
    *B32B 17/06*    (2006.01)
    *B32B 27/08*    (2006.01)
    (Continued)

(52) U.S. Cl.
    CPC .............. *B32B 17/065* (2013.01); *B32B 7/12* (2013.01); *B32B 15/082* (2013.01);
    (Continued)

(58) Field of Classification Search
    CPC ....... B32B 17/065; B32B 7/12; B32B 15/082; B32B 15/085; B32B 15/088; B32B 15/09;
    (Continued)

(56) References Cited

U.S. PATENT DOCUMENTS 3,338,696 A    8/1967  Dockerty
3,682,609 A    8/1972  Dockerty
(Continued)

FOREIGN PATENT DOCUMENTS

CN    101097381 A    1/2008
EP      1083044 A1   3/2001
(Continued)

OTHER PUBLICATIONS

Composite Material And Method For The Production Thereof. WO 2006005316 A1 (Year: 2006).*
(Continued)

*Primary Examiner* — Betelhem Shewareged
(74) *Attorney, Agent, or Firm* — Svetlana Z. Short (57) ABSTRACT

A glass laminate includes a non-glass substrate with a first surface and a second surface opposite the first surface. A glass sheet is laminated to the first surface of the non-glass substrate. A barrier film is laminated to the second surface of the non-glass substrate and includes a first surface adjacent to the non-glass substrate, a second surface opposite the first surface. A thickness of the barrier film can be at most about 0.5 mm. The second surface of the barrier film can define an outer surface of the glass laminate. The barrier film can be a multi-layer barrier film with a metal layer and a polymer layer. An absolute value of a flatness of the glass laminate determined according to European Standard EN 438 after exposure to 23° C. and 90% relative humidity for 7 days can be at most about 3 mm/m.

20 Claims, 3 Drawing Sheets

(51) Int. Cl.
    *B32B 27/10*           (2006.01)
    *B32B 27/34*           (2006.01)
    *B32B 27/36*           (2006.01)
    *B32B 7/12*            (2006.01)
    *B32B 15/082*          (2006.01)
    *B32B 15/085*          (2006.01)
    *B32B 15/088*          (2006.01)
    *B32B 15/09*           (2006.01)
    *B32B 27/30*           (2006.01)

(52) U.S. Cl.
    CPC .......... *B32B 15/085* (2013.01); *B32B 15/088* (2013.01); *B32B 15/09* (2013.01); *B32B 27/08* (2013.01); *B32B 27/10* (2013.01); *B32B 27/308* (2013.01); *B32B 27/34* (2013.01); *B32B 27/36* (2013.01); *B32B 2260/028* (2013.01); *B32B 2260/046* (2013.01); *B32B 2307/412* (2013.01); *B32B 2307/7246* (2013.01); *B32B 2323/043* (2013.01); *B32B 2333/00* (2013.01); *B32B 2367/00* (2013.01); *B32B 2377/00* (2013.01)

(58) Field of Classification Search
    CPC ....... B32B 27/08; B32B 27/10; B32B 27/308; B32B 27/34; B32B 27/36; B32B 2260/028; B32B 2260/046; B32B 2307/412; B32B 2307/7246; B32B 2323/043; B32B 2333/00; B32B 2367/00; B32B 2377/00; B32B 37/10
    USPC ....................................................... 428/213
    See application file for complete search history.

(56) References Cited

U.S. PATENT DOCUMENTS

| | | | |
|---|---|---|---|
| 3,895,158 A | | 7/1975 | Gause et al. |
| 4,027,061 A | | 5/1977 | Cartier et al. |
| 4,337,997 A | | 7/1982 | Sadoune et al. |
| 6,650,478 B1 * | 11/2003 | DeBusk | ............... C03C 17/3639 |
| | | | 359/359 |
| 7,393,584 B2 | | 7/2008 | Haldeman |
| 7,989,147 B2 | | 8/2011 | Kim et al. |
| 8,239,981 B2 | | 8/2012 | Epp et al. |
| 8,490,482 B2 | | 7/2013 | Arms et al. |
| 11,247,435 B2 * | 2/2022 | Kim | ........................ B32B 15/12 |
| 2010/0227135 A1 * | 9/2010 | Takagi | .................... B32B 7/022 |
| | | | 428/339 |
| 2011/0081542 A1 | | 4/2011 | Pilloy et al. |
| 2012/0034435 A1 | | 2/2012 | Borrelli et al. |
| 2014/0147561 A1 | | 5/2014 | Bower et al. |
| 2015/0110991 A1 | | 4/2015 | Miwa et al. |
| 2015/0251377 A1 | | 9/2015 | Cleary et al. |
| 2015/0314572 A1 * | 11/2015 | Murashige | .............. B32B 17/10 |
| | | | 242/534 |
| 2015/0336357 A1 | | 11/2015 | Kang et al. |
| 2016/0031187 A1 | | 2/2016 | Zhang et al. |
| 2016/0052241 A1 | | 2/2016 | Zhang |
| 2019/0184683 A1 | | 6/2019 | Kim et al. |
| 2022/0134711 A1 * | 5/2022 | Kim | ...................... B32B 27/308 |
| | | | 428/333 |

FOREIGN PATENT DOCUMENTS

| | | |
|---|---|---|
| EP | 2886013 A2 | 6/2015 |
| JP | 63-227334 A | 9/1988 |
| JP | 2000-071373 A | 3/2000 |
| KR | 10-2001-0016028 A | 3/2001 |
| KR | 10-0918559 B1 | 9/2009 |
| WO | 2006/005316 A1 | 1/2006 |
| WO | 2006/076362 A1 | 7/2006 |
| WO | 2014/166082 A1 | 10/2014 |

OTHER PUBLICATIONS

Chinese Patent Application No. 201780053543.1, Office Action dated Jul. 28, 2021, 5 pages (English Translation Only), Chinese Patent Office.
EP17847007.6 Office Action dated Mar. 26, 2020; 10 Pages; European Patnet Office.
International Search Report and Written Opinion of the International Searching Authority; PCT/KR2017/009513; dated Dec. 20, 2017; 5 Pages.
Supplementary European search report and Written Opinion dated Mar. 26, 2020 for EP Application No. 17847007, 9 pages.

* cited by examiner

GLASS LAMINATES WITH IMPROVED FLATNESS AND METHODS FOR FORMING THE SAME

This Application is a continuation of U.S. application Ser. No. 16/327,917 filed Feb. 25, 2019, which claims benefit of priority under 35 U.S.C. § 371 of International Application No. PCT/KR2017/009513, filed on Aug. 30, 2017, which claims the benefit of priority to Korean Application No. 10-2016-0112061, filed on Aug. 31, 2016, the content both of which are incorporated herein by reference in their entirety.

BACKGROUND

1. Field

This disclosure relates to glass laminates, and more particularly to laminates including a glass sheet laminated to a non-glass substrate and that have improved flatness after exposure to temperature and/or humidity changes.

2. Technical Background

Glass laminates generally include a glass sheet laminated to a non-glass substrate. Such glass laminates can be used as architectural panels that can be employed as wall panels, backsplashes, cabinet or furniture faces, appliance faces, or other architectural applications. The glass laminates can be exposed to relatively large changes in temperature and/or humidity (e.g., during formation, transportation, installation, and/or use), which can cause expansion or contraction of the non-glass substrate. Such expansion or contraction of the non-glass substrate can cause mechanical stress within the glass laminate, resulting in bowing, cracking, delamination, or other defects in the glass laminate.

SUMMARY

Disclosed herein are glass laminates with improved flatness and methods for forming the same.

Disclosed herein is a glass laminate comprising a non-glass substrate comprising a first surface and a second surface opposite the first surface. A glass sheet is laminated to the first surface of the non-glass substrate. A barrier film is laminated to the second surface of the non-glass substrate and comprises a first surface adjacent to the non-glass substrate, a second surface opposite the first surface, and a thickness of at most about 0.5 mm. The second surface of the barrier film defines an outer surface of the glass laminate.

Disclosed herein is a glass laminate comprising a non-glass substrate comprising a first surface and a second surface opposite the first surface. A glass sheet is laminated to the first surface of the non-glass substrate. A multi-layer barrier film is laminated to the second surface of the non-glass substrate and comprises a metal layer and a polymer layer. An absolute value of a flatness of the glass laminate determined according to European Standard EN 438 after exposure to 23° C. and 90% relative humidity for 7 days is at most about 3 mm/m.

Disclosed herein is a method for forming a glass laminate. The method comprises laminating a glass sheet to a first surface of a non-glass substrate. A multi-layer barrier film is laminated to a second surface of the non-glass substrate and comprises a metal layer and a polymer layer.

It is to be understood that both the foregoing general description and the following detailed description are merely exemplary, and are intended to provide an overview or framework to understanding the nature and character of the claimed subject matter. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "flatness" refers to the flatness of a glass laminate or component thereof determined according to European Standard EN 438, which is incorporated by reference herein in its entirety. Flatness is a commonly reported property of commercially available high pressure laminate (HPL) materials. The flatness of a glass laminate can be determined prior or subsequent to exposing the glass laminate to elevated temperature and/or humidity for a determined period of time. For example, the flatness of various glass laminates described herein was determined after exposure to 23° C. and 90% relative humidity for 7 days.

As used herein, the term "change in flatness" refers to the difference between the flatness of a glass laminate prior to exposure to elevated temperature and/or humidity and the flatness of the glass laminate after exposure to elevated temperature and/or humidity.

As used herein, the term "water vapor transmission rate" refers to the water vapor transmission rate of a material or layer, which can be determined, for example, according to ASTM F1249-13 "Standard Test Method for Water Vapor Transmission Rate Through Plastic Film and Sheeting Using a Modulated Infrared Sensor" or ASTM E398-13 "Standard Test Method for Water Vapor Transmission Rate of Sheet Materials Using Dynamic Relative Humidity Measurement," each of which is incorporated by reference herein in its entirety.

In various embodiments, a glass laminate comprises a non-glass substrate comprising a first surface and a second surface opposite the first surface. A glass sheet is laminated to the first surface of the non-glass substrate. A barrier film is laminated to the second surface of the non-glass substrate. The barrier film comprises a first surface adjacent to the non-glass substrate and a second surface opposite the first surface. In some embodiments, the barrier film is a multi-layer barrier film comprising a metal layer and a polymer layer. Additionally, or alternatively, a thickness of the barrier film is at most about 0.5 mm. Additionally, or alternatively, the second surface of the barrier film defines an outer surface of the glass laminate. Additionally, or alternatively, an absolute value of a flatness of the glass laminate determined according to European Standard EN 438 after exposure to 23° C. and 90% relative humidity for 7 days is at most about 3 mm/m.

In various embodiments, a method for forming a glass laminate comprises laminating a glass sheet to a first surface of a non-glass substrate and laminating a multi-layer barrier film to a second surface of the non-glass substrate. The multi-layer barrier film comprises a metal layer and a polymer layer. In some embodiments, the non-glass substrate is formed prior to the laminating the glass sheet and the laminating the multi-layer barrier film. For example, the method comprises forming the non-glass substrate prior to the laminating the glass sheet by pressing a stack of polymer impregnated papers to bond the polymer impregnated papers. In some embodiments, the pressing the stack of polymer impregnated papers comprises a high pressure laminate (HPL) process or a low pressure laminate (LPL) process.

Surprisingly, the glass laminates with the barrier film laminated to the surface of the non-glass substrate opposite the glass sheet as described herein exhibit improved flatness compared to glass laminates with one or more moisture-resistant layers embedded within the non-glass substrate, particularly after exposure to elevated temperature and humidity.

Figure 1:
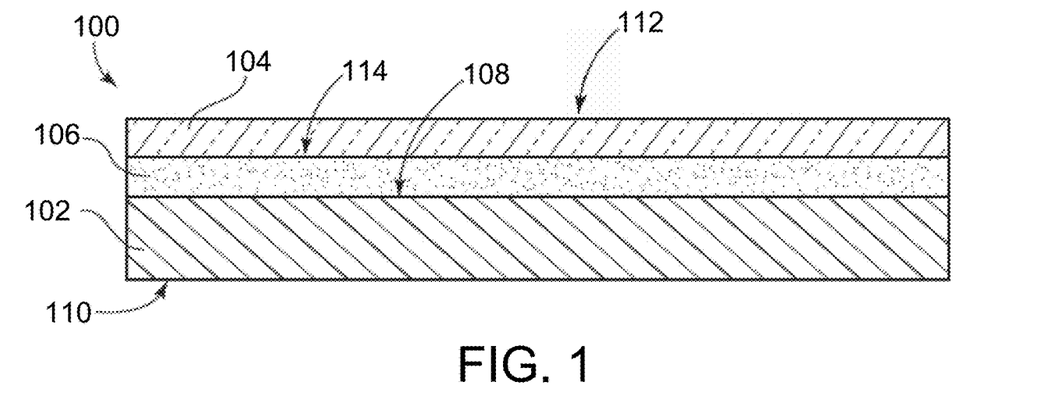
FIG. 1 is a cross-sectional schematic view of one example of a glass laminate that is free of a barrier film laminated to a surface of the non-glass substrate opposite the glass sheet.

FIG. 1 is a schematic cross-sectional view of one example of a glass laminate 100 comprising a non-glass substrate 102 and a glass sheet 104 laminated to the non-glass substrate with an adhesive 106. Non-glass substrate 102 comprises a first surface 108 and a second surface 110 opposite the first surface. Glass sheet 104 comprises a first surface 112 and a second surface 114. Glass sheet 104 is laminated to first surface 108 of non-glass substrate 102. Thus, first surface 108 of non-glass substrate 102 is bonded to second surface 114 of glass sheet 104 with adhesive 106. Glass laminate 100 is free of any barrier layer laminated to second surface 110 of non-glass substrate 102. Thus, second surface 110 of non-glass substrate 102 is an outer surface of glass laminate 100, and first surface 112 of glass sheet 104 is another outer surface of glass laminate 100.

In the example shown in FIG. 1, non-glass substrate 102 is a HPL material formed from a plurality of polymer impregnated papers. Glass generally is considered a hermetic material, and the HPL material of non-glass substrate 102 has a significantly higher water vapor transmission rate (WVTR) than glass sheet 104. Thus, moisture is able to enter or exit glass laminate 100 through second surface 110 of non-glass substrate 102, but moisture is substantially unable to enter or exit the glass laminate through first surface 112 of glass sheet 104. Although moisture is able to enter or exit non-glass substrate 102 through second surface 110 of the non-glass substrate, because glass sheet 104 is laminated to first surface 108 of the non-glass substrate, moisture is substantially unable to enter or exit the non-glass substrate through the first surface of the non-glass substrate.

Figure 2:
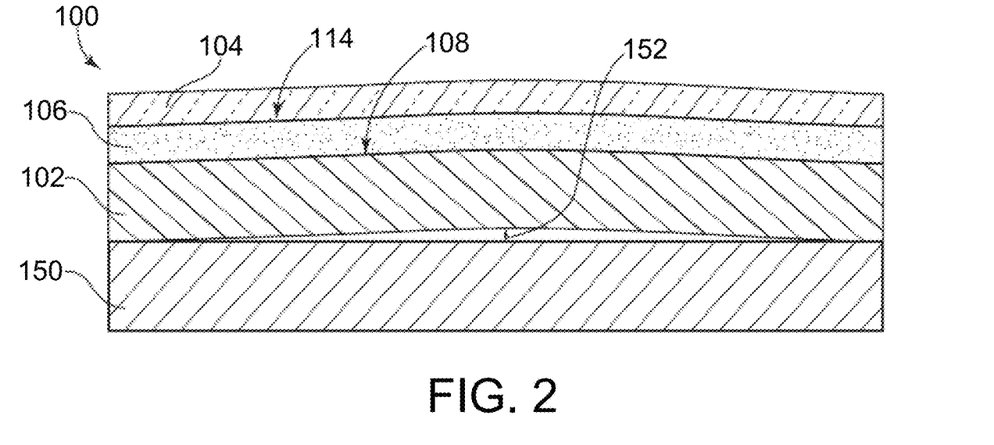
FIG. 2 is a schematic cross-sectional view of the glass laminate of FIG. 1 disposed on a flat test surface after exposure to low humidity.

FIG. 2 is a schematic cross-sectional view of glass laminate 100 disposed on a flat test surface 150 after exposure to low humidity. Upon exposure to low humidity, moisture can exit non-glass substrate 102, causing the non-glass substrate to contract or shrink relative to glass sheet 104. Such contraction can result in bowing 152 of glass laminate 100 in an upward direction toward glass sheet 104 as shown in FIG. 2. As used herein, upward bowing of a glass laminate is denoted by a positive (+) flatness value and results in glass sheet 104 being placed in a concave orientation with respect to a direction toward non-glass substrate 102. Placing glass sheet 104 in such a concave orientation results in formation of tensile stress in the glass sheet, which can reduce the strength of the glass sheet and/or cause the glass sheet to fail.

Figure 3:
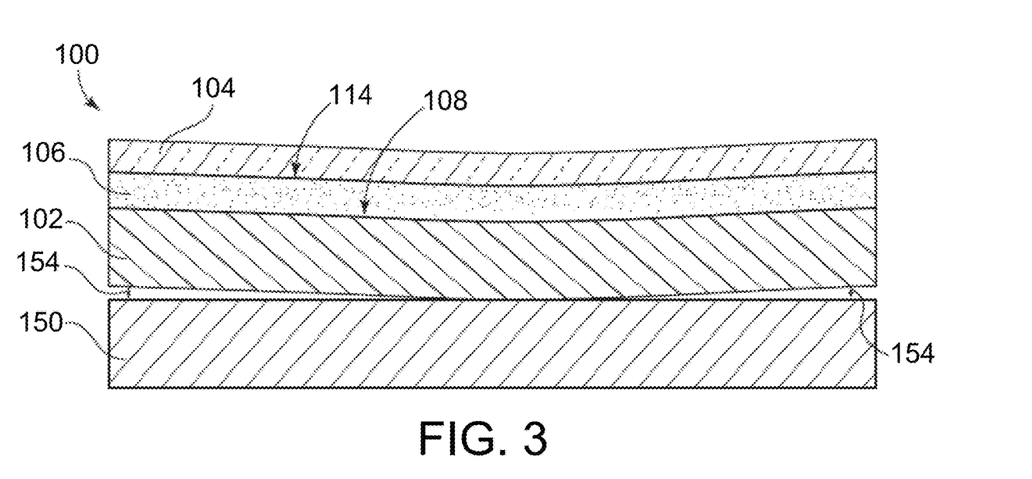
FIG. 3 is a schematic cross-sectional view of the glass laminate of FIG. 1 disposed on a flat test surface after exposure to high humidity.

FIG. 3 is a schematic cross-sectional view of glass laminate 100 disposed on flat test surface 150 after exposure to high humidity. Upon exposure to high humidity, moisture can enter non-glass substrate 102, causing the non-glass substrate to expand relative to glass sheet 104. Such expansion can result in bowing 154 of glass laminate 100 in a downward direction away from glass sheet 104 as shown in FIG. 3. As used herein, downward bowing of a glass laminate is denoted by a negative (−) flatness value and results in glass sheet 104 being placed in a convex orientation with respect to the direction toward non-glass substrate 102. Placing glass sheet 104 in such a convex orientation results in formation of compressive stress in the glass sheet, which can increase the strength of the glass sheet.

Figure 4:
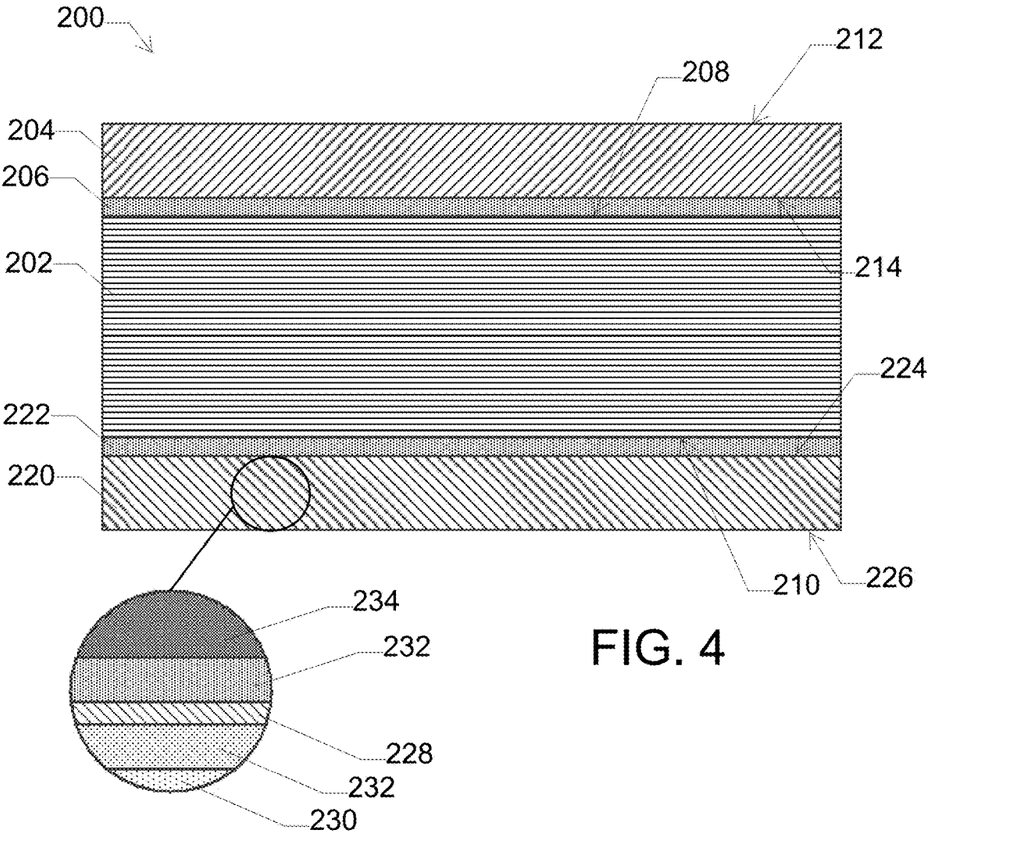
FIG. 4 is a schematic cross-sectional view of one embodiment of a glass laminate with a barrier film laminated to a surface of the non-glass substrate opposite the glass sheet.

FIG. 4 is a schematic cross-sectional view of one embodiment of a glass laminate 200. Glass laminate 200 is similar to glass laminate 100 described with reference to FIG. 1 in some respects. For example, glass laminate 200 comprises a non-glass substrate 202 and a glass sheet 204 laminated to the non-glass substrate with an adhesive 206. Non-glass substrate 102 comprises a first surface 208 and a second surface 210 opposite the first surface. Glass sheet 204 comprises a first surface 212 and a second surface 214. Glass sheet 204 is laminated to first surface 208 of non-glass substrate 202. Thus, first surface 208 of non-glass substrate 202 is bonded to second surface 214 of glass sheet 204 with adhesive 206.

Unlike glass laminate 100, glass laminate 200 shown in FIG. 4 comprises a barrier film 220 laminated to non-glass substrate with an adhesive 222. Barrier film 220 comprises a first surface 224 and a second surface 226 opposite the first surface. Barrier film 220 is laminated to second surface 210 of non-glass substrate 202. Thus, second surface 210 of non-glass substrate 202 is bonded to first surface 224 of barrier film 220 with adhesive 222. In some embodiments, second surface 226 of barrier film 220 is an outer surface of glass laminate 200, and first surface 212 of glass sheet 204 is another outer surface of glass laminate 200.

In some embodiments, non-glass substrate 202 is a HPL material, and barrier film 220 comprises a substantially lower WVTR than the non-glass substrate. For example, barrier film 220 can be considered a hermetic material. Thus, moisture is substantially unable to enter or exit glass laminate 200 through glass sheet 104 or through barrier film 220. Because glass sheet 204 is laminated to first surface 208 of non-glass substrate 202, moisture is substantially unable to enter or exit the non-glass substrate through the first surface of the non-glass substrate. Similarly, because barrier film 220 is laminated to second surface 210 of non-glass substrate 202, moisture is substantially unable to enter or exit the non-glass substrate through the second surface of the non-glass substrate.

By substantially preventing moisture from entering or exiting non-glass substrate 202 at first surface 208 and second surface 210 of the non-glass substrate, glass sheet 204 and barrier film 220 cooperatively help to prevent humidity-related expansion and contraction of the non-glass substrate upon exposure of glass laminate 200 to elevated temperature and humidity, which can help to prevent bowing of the glass laminate and/or breakage of the glass sheet. Surprisingly, barrier film 220 laminated to second surface 210 of non-glass substrate 202 opposite glass sheet 204 as shown in FIG. 4 is more effective at preventing bowing of glass laminate 200 compared to moisture-resistant layers embedded within the non-glass substrate as further explained herein. Thus, glass laminate 200 with barrier film 220 laminated to second surface 210 of non-glass substrate 202 exhibits improved flatness compared to glass laminate 100, even if non-glass substrate 102 of glass laminate 100 includes one or more moisture-resistant layers embedded within the non-glass substrate.

In various embodiments, non-glass substrate 202 is formed from or comprises primarily non-glass materials. For example, non-glass substrate 202 comprises wood, fiberboard, laminate, composite, polymeric, and/or metal materials. In some embodiments, non-glass substrate 202 comprises a wood or wood-based product such as chipboard, particleboard, fiberboard, cardboard, hardboard, or paper. In some of such embodiments, non-glass substrate 202 comprises a LPL, a HPL, and/or a veneer. In some embodiments, non-glass substrate 202 comprises one or more layers of polymer-impregnated paper as described herein. In some embodiments, non-glass substrate 202 is selected from the group consisting of a high pressure laminate (HPL) panel, a low pressure laminate (LPL) panel, a wood-based panel, a polymer panel, and combinations thereof. In some embodiments, non-glass substrate 202 comprises glass, glass-ceramic and/or ceramic materials as secondary constituents (e.g., fillers). However, in such embodiments, non-glass substrate 202 is free of glass, glass-ceramic, or ceramic sheets (e.g., solid or substantially solid sheets as opposed to fibrous mats or weaves).

In some embodiments, non-glass substrate 202 is formed from or comprises a polymer material. For example, non-glass substrate comprises polyethylene teraphthalate (PET), polyethylene naphthalate (PEN), ethylene tetrafluoroethylene (ETFE), or thermopolymer polyolefin (TPO™—polymer/filler blends of polyethylene, polypropylene, block copolymer polypropylene (BCPP), or rubber), polyesters, polycarbonate, polyvinylbuterate, polyvinyl chloride, polyethylene and substituted polyethylenes, polyhydroxybutyrates, polyhydroxyvinylbutyrates, polyetherimides, polyamides, polyethylenenaphalate, polyimides, polyethers, polysulphones, polyvinylacetylenes, transparent thermoplastics, transparent polybutadienes, polycyanoacrylates, cellulose-based polymers, polyacrylates and polymethacrylates, polyvinylalcohol, polysulphides, polyvinyl butyral, polymethyl methacrylate, polysiloxanes, compatible mixtures thereof, or compatible combinations thereof. In some embodiments, the polymer material can be deposited or coated as a pre-polymer or pre-compound and then converted. Such polymer materials comprise, for example, epoxy-resins, polyurethanes, phenol-formaldehyde resins, melamine-formaldehyde resins, compatible mixtures thereof, or compatible combinations thereof.

In some embodiments, a thickness of non-glass substrate 202 (e.g., a distance between first surface 208 and second surface 210) is at least about 1 mm, at least about 2 mm, at least about 3 mm, at least about 4 mm, at least about 5 mm, at least about 6 mm, at least about 7 mm, at least about 8 mm, at least about 9 mm, or at least about 10 mm. Additionally, or alternatively, the thickness of non-glass substrate 202 is at most about 30 mm, at most about 29 mm, at most about 28 mm, at most about 27 mm, at most about 26 mm, at most about 25 mm, at most about 24 mm, at most about 23 mm, at most about 22 mm, at most about 21 mm, or at most about 20 mm.

In various embodiments, glass sheet 204 is formed from or comprises a glass material, a ceramic material, a glass-ceramic material, or a combination thereof. Glass sheet 204 can be formed using a downdraw process (e.g., a fusion draw process). Glass sheets produced using a fusion draw process have surfaces with superior flatness and smoothness when compared to glass sheets produced by other methods. The fusion process is described in U.S. Pat. Nos. 3,338,696 and 3,682,609, each of which is incorporated by reference herein in its entirety. Other suitable glass sheet forming processes that may be used to produce glass sheet 2014 include float, updraw, rolling, and slot draw processes.

In some embodiments, glass sheet 204 comprises anti-microbial properties. For example, glass sheet 204 comprises a silver ion concentration at the surface of the glass sheet (e.g., in the range from greater than 0 to 0.047 $\mu g/cm^2$) as described in U.S. Patent Application Publication No. 2012/0034435, which is incorporated by reference herein in its entirety. Additionally, or alternatively, glass sheet 204 is coated with a glaze comprising silver, or otherwise doped with silver ions, to exhibit anti-microbial properties as described in U.S. Patent Application Publication No. 2011/0081542, which is incorporated by reference herein in its entirety. In some embodiments, glass sheet 204 comprises about 50 mol % $SiO_2$, about 25 mol % CaO, and about 25 mol % $Na_2O$ to exhibit anti-microbial properties.

In some embodiments, a thickness of glass sheet 204 (e.g., a distance between first surface 212 and second surface 214) is at least about 0.01 mm, at least about 0.02 mm, at least about 0.03 mm, at least about 0.04 mm, at least about 0.05 mm, at least about 0.06 mm, at least about 0.07 mm, at least about 0.0 8 mm, at least about 0.09 mm, or at least about 0.1 mm. Additionally, or alternatively, a thickness of glass sheet 204 is at most about 3 mm, at most about 2 mm, at most about 1 mm, at most about 0.7 mm, at most about 0.5 mm, at most about 0.3 mm, at most about 0.2 mm, or at most about 0.1 mm. In some embodiments, glass sheet 204 is a flexible glass sheet. For example, the thickness of glass sheet 204 is at most about 0.3 mm.

In various embodiments, adhesive 206 is formed from or comprises a sheet or film of adhesive, a liquid adhesive, a powder adhesive, a pressure sensitive adhesive, an ultraviolet (UV) light curable adhesive, a thermally curable adhesive, or a combination thereof. For example, adhesive 206 comprises a low temperature adhesive material, such as Norland Optical Adhesive 68 (Norland Products, Inc.), FLEXcon V29TT adhesive, 3M™ optically clear adhesive (OCA) 8211, 8212, 8214, 8215, 8146, 8171, or 8172 (bonded by pressure at room temperature or above), 3M™ 4905 tape, OptiClear® adhesive, Graphicmount or Facemount (LexJet Corporation), silicones, acrylates, optically clear adhesives, encapsulant material, polyurethane polyvinylbutyrates, ethylenevinylacetates, ionomers, or wood glues. Also for example, adhesive 206 comprises a higher temperature adhesive material, such as DuPont SentryGlas®, DuPont PV 5411, Japan World Corporation material FAS, or polyvinyl butyral resin. In some embodiments, adhesive 206 comprises a functional component that exhibits, for example, color, decoration, heat or UV resistance, IR filtration, or combinations thereof. Additionally, or alternatively, adhesive 206 is optically clear on cure, translucent, or opaque. In embodiments in which adhesive 206 is a sheet or film of adhesive, the adhesive may comprise a decorative pattern or design visible through glass sheet 204.

In some embodiments, a thickness of adhesive 206 (e.g., between first surface 208 of non-glass substrate 202 and second surface 214 of glass sheet 204) is at most about 5000 µm, at most about 1000 µm, at most about 500 µm, at most about 250 µm, at most about 50 µm, at most about 40 µm, at most about 30 µm, or at most about 25 µm. Additionally, or alternatively, the thickness of adhesive 206 is at least about 5 µm, at least about 10 µm, at least about 15 µm, or at least about 20 µm. In some embodiments, the thickness of adhesive 206 is between about 5 µm and about 500 µm.

In various embodiments, adhesive 222 can be configured as described herein with regard to adhesive 206. Adhesive 206 and adhesive 222 can be formed from or comprise the same or different materials and can have the same or different thicknesses.

In some embodiments, barrier film 220 is a multi-layer barrier film. In such embodiments, barrier film 220 comprises a plurality of distinct layers adhered together. For example, the distinct layers are adhered to one another without being fused. Thus, the distinct layers remain distinct rather than becoming a fused monolithic structure, such as a HPL or LPL structure. In some embodiments, barrier film 220 comprises a metal layer and a polymer layer. For example, the inset in FIG. 4 shows one embodiment of a multi-layer barrier film comprising, consisting essentially of, or consisting of 5 distinct layers. The multi-layer barrier film comprises a metal layer 228 and a plurality of polymer layers. Metal layer 228 is an aluminum foil. The plurality of polymer layers comprises a PET film 230, PE films 232, and a linear low density polyethylene (LLDPE) film 234. The distinct layers can be adhered together to form the film using adhesives, by applying heat and/or pressure, or another suitable film-forming process. Metal layer 228 is disposed between PE films 232 such that the metal layer is encapsulated within multi-layer barrier film 220. Such encapsulation of the metal layer can help to protect the metal layer from physical damage and/or environmental exposure that can adversely affect the barrier properties of the metal layer. Thus, the multi-layer barrier film can exhibit a low WVTR to enable improved flatness of glass laminate 200 and also a durable outer surface provided by the polymer layers.

In some embodiments, the metal layer is formed from or comprises a metal material. For example, the metal material is selected from the group consisting of aluminum, copper, tin, gold, iron, titanium, and combinations thereof. In some embodiments, the metal layer is formed from or comprises a metal oxide material. For example, the metal oxide material is selected from the group consisting of oxides of aluminum, copper, indium, tin, gold, iron, titanium, zinc, silicon, and combinations thereof. Additionally, or alternatively, the metal layer has a thickness of about 20 nm to about 50 µm. For example, the metal layer is a metal foil or a metal oxide layer (e.g., deposited on a polymer layer using a deposition process such as physical or chemical vapor deposition, atomic layer deposition, or another deposition process).

In some embodiments, the polymer layer comprises a plurality of polymer layers. In some of such embodiments, the metal layer is disposed between two of the plurality of polymer layers. Thus, the metal layer is substantially or entirely encapsulated within the polymer layers. In some embodiments, the polymer layer comprises a material selected from the group consisting of polyethylene terephthalate (PET), polyethylene (PE), linear low density polyethylene (LLDPE), polyacrylate, nylon, compatible mixtures thereof, and compatible combinations thereof. The multi-layer barrier film can provide a low WVTR to enable improved flatness as described herein while also providing a durable outer surface for the glass laminate.

In some embodiments, barrier film 220 is transparent. For example, barrier film 220 comprises an average transmittance of at least about 70%, at least about 75%, at least about 80%, at least about 85%, at least about 90%, at least about 95%, at least about 98%, or at least about 99% over a wavelength range of 400 nm to 750 nm. In some embodiments, metal oxides can be used as the metal layer in a transparent barrier film. In some embodiments, barrier film 220 and adhesive 222 are transparent such that non-glass substrate 202 is visible through the barrier film and the adhesive. In some of such embodiments, non-glass substrate 202 comprises a decoration (e.g., at second surface 210) that is visible through barrier film 220 and adhesive 222. In other embodiments, barrier film 220 is transparent, and adhesive 222 comprises a decoration that is visible through barrier film 220. In other embodiments, barrier film 220 comprises a decorative layer (e.g., one or more of the polymer layers) that is visible from the outer surface of glass laminate 200.

Although the multi-layer barrier film shown in FIG. 4 is a 5-layer barrier film, other embodiments are included in this disclosure. In other embodiments, the multi-layer barrier film comprises, consists essentially of, or consists of a determined number of layers (e.g., 2, 3, 4, or more layers). In some embodiments, the multi-layer barrier film comprises adhesives disposed between adjacent layers.

In some embodiments, barrier film 220 is a single layer barrier film. For example, barrier film 220 is formed from, comprises, consists essentially of, or consists of a metal layer. The metal layer can be configured as described herein with regard to the multi-layer barrier film.

In some embodiments, barrier film 220 is free or substantially free of glass sheet materials. For example, barrier film 220 can comprise glass, glass-ceramic and/or ceramic materials as secondary constituents (e.g., fillers). However, in such embodiments, barrier film 220 is free of glass, glass-ceramic, or ceramic sheets (e.g., solid or substantially solid sheets as opposed to fibrous mats or weaves). In other embodiments, barrier film 220 comprises glass sheet materials. Although such glass sheet materials exhibit low WVTR, and therefore, enable improved flatness, glass laminates comprising such barrier films with glass sheet materials can be difficult to manufacture, cut, and handle during manufacturing, transportation, and/or installation.

In some embodiments, a thickness of barrier film 220 (e.g., between first surface 224 and second surface 226) is at most about 0.5 mm, at most about 0.4 mm, at most about 0.3 mm, at most about 0.2 mm, or at most about 0.1 mm. Additionally, or alternatively, the thickness of barrier film 220 is at least about 0.01 mm, at most about 0.02 mm, at most about 0.03 mm, at most about 0.04 mm, or at most about 0.05 mm.

In various embodiments, barrier film 220 comprises a WVTR of at most about 2 $g/m^2/day$, at most about 1 $g/m^2/day$, at most about 0.9 $g/m^2/day$, at most about 0.8 $g/m^2/day$, at most about 0.7 $g/m^2/day$, at most about 0.6 $g/m^2/day$, at most about 0.5 $g/m^2/day$, at most about 0.4 $g/m^2/day$, at most about 0.3 $g/m^2/day$, at most about 0.2 $g/m^2/day$, or at most about 0.1 $g/m^2/day$, measured at 45° C. and determined according to ASTM F1249-13. In some embodiments, the WVTR of barrier film 220 measured at 45° C. is at most about 100,000 times, at most about 10,000 times, at most about 1,000 times, or at most about 100 times the moisture diffusivity of glass sheet 204 measured at 45° C. For example, Corning® Willow® Glass has been reported as having a WVTR of <7×10$^{-6}$ g/m$^2$/day, measured at 45° C. and determined according to ASTM F1249-13.

In various embodiments, barrier film 220 comprises a WVTR of at most about 2 g/m$^2$/day, at most about 1 g/m$^2$/day, at most about 0.9 g/m$^2$/day, at most about 0.8 g/m$^2$/day, at most about 0.7 g/m$^2$/day, at most about 0.6 g/m$^2$/day, at most about 0.5 g/m$^2$/day, at most about 0.4 g/m$^2$/day, at most about 0.3 g/m$^2$/day, at most about 0.2 g/m$^2$/day, or at most about 0.1 g/m$^2$/day, measured at 45° C. and determined according to ASTM E398-13. In some embodiments, the WVTR of barrier film 220 measured at 45° C. is at most about 100,000 times, at most about 10,000 times, at most about 1,000 times, or at most about 100 times the moisture diffusivity of glass sheet 204 measured at 45° C. For example, Corning® Willow® Glass has been reported as having a WVTR of <7×10$^{-6}$ g/m$^2$/day, measured at 45° C. and determined according to ASTM E398-13.

In some embodiments, an absolute value of a flatness of glass laminate 200 determined according to European Standard EN 438 after exposure to 23° C. and 90% relative humidity for 7 days is at most about 10 mm/m, at most about 9 mm/m, at most about 8 mm/m, at most about 7 mm/m, at most about 6 mm/m, at most about 5 mm/m, at most about 4 mm/m, at most about 3 mm/m, at most about 2 mm/m, at most about 1.5 mm/m, at most about 1.2 mm/m, at most about 1.1 mm/m, at most about 1 mm/m, at most about 0.9 mm/m, at most about 0.8 mm/m, at most about 0.7 mm/m, at most about 0.6 mm/m, or at most about 0.5 mm/m. Additionally, or alternatively, an absolute value of a change in flatness of glass laminate 200 determined according to European Standard EN 438 upon exposure to 23° C. and 90% relative humidity for 7 days is at most about 10 mm/m, at most about 9 mm/m, at most about 8 mm/m, at most about 7 mm/m, at most about 6 mm/m, at most about 5 mm/m, at most about 4 mm/m, at most about 3 mm/m, at most about 2 mm/m, at most about 1.5 mm/m, at most about 1.2 mm/m, at most about 1.1 mm/m, at most about 1 mm/m, at most about 0.9 mm/m, at most about 0.8 mm/m, at most about 0.7 mm/m, at most about 0.6 mm/m, or at most about 0.5 mm/m.

In some embodiments, a method for forming glass laminate 200 comprises laminating glass sheet 204 to first surface 208 of non-glass substrate 202. For example, laminating glass sheet 204 to first surface 208 comprises applying adhesive 206 to second surface 214 of the glass sheet and/or first surface 208 of non-glass substrate 202 and joining the glass sheet and the non-glass substrate with the adhesive. Thus, after the laminating, glass sheet 204 is adhered to non-glass substrate 202 as opposed to being integrated or embedded in the non-glass substrate. The laminating can be performed using a suitable lamination process, such as, for example, a roll lamination process, an autoclave lamination process, or a vacuum lamination process.

In some embodiments, the method comprises laminating barrier film 220 to second surface 210 of non-glass substrate. For example, laminating barrier film 220 to second surface 210 comprises applying adhesive 222 to first surface 224 of the barrier film and/or second surface 210 of non-glass substrate 202 and joining the barrier film and the non-glass substrate with the adhesive. Thus, after the laminating, barrier film 220 is adhered to non-glass substrate 202 as opposed to being integrated or embedded in the non-glass substrate. The laminating barrier film 220 to non-glass substrate 202 can be performed before, after, or concurrently with the laminating glass sheet 204 to the non-glass substrate.

In some embodiments, the method further comprises forming non-glass substrate 202 prior to the laminating glass sheet 204 and barrier film 220. For example, the forming non-glass substrate 202 comprises pressing a stack of polymer impregnated papers to bond the polymer impregnated papers. In some of such embodiments, the pressing the stack of polymer impregnated papers comprises a HPL process or a LPL process.

In some embodiments, subsequent to the laminating barrier film 220, first surface 224 of the barrier film is adjacent to non-glass substrate 202 and second surface 226 of the barrier film opposite the first surface defines an outer surface of glass laminate 200. Thus, glass laminate 200 is free of any additional layer or material laminated to second surface 226 of barrier film 220.

EXAMPLES

Various embodiments will be further clarified by the following examples.

Example 1

A glass laminate having the general configuration shown in FIG. 4 was formed. The non-glass substrate was an 8 mm thick HPL panel with a 40 μm thick aluminum layer embedded beneath a decorative surface layer disposed at each outer surface of the non-glass substrate and commercially available as Material Exterior Grade (MEG) panels from ABET, Inc. (Englewood, N.J., USA). The glass sheet was a flexible aluminosilicate glass sheet with a thickness of 0.2 mm commercially available as Corning® Willow® Glass from Corning Incorporated (Corning, N.Y., USA). The barrier film was an aluminum foil with a thickness of 30 μm. Each of the glass sheet and the barrier film was laminated to the non-glass substrate with an optically clear adhesive commercially available as 3M™ Optically Clear Adhesive 8215 from 3M Company (Maplewood, Minnesota, USA). The lap shear adhesion was 1.18 MPa.

The lamination process included applying the adhesive to a first surface of the non-glass substrate using a nip roller and applying the glass sheet to the adhesive covered first surface of the non-glass substrate. The adhesive was applied to a second surface of the non-glass substrate using a nip roller, and the barrier film was applied to the adhesive covered second surface of the non-glass substrate.

Example 2

A glass laminate having the general configuration shown in FIG. 4 was formed. The non-glass substrate was a HPL panel configured as described in Example 1. The glass sheet was a flexible aluminosilicate glass sheet as described in Example 1. The barrier film was a steel sheet with a thickness of 100 μm. Each of the glass sheet and the barrier film was laminated to the non-glass substrate with the adhesives described in Example 1.

Example 3

A glass laminate having the general configuration shown in FIG. 4 was formed. The non-glass substrate was a HPL panel configured as described in Example 1. The glass sheet was a flexible aluminosilicate glass sheet as described in Example 1. The barrier film was a flexible aluminosilicate glass sheet with a thickness of 0.2 mm. Each of the glass sheet and the barrier film was laminated to the non-glass substrate with the adhesives described in Example 1.

Example 4

A glass laminate having the general configuration shown in FIG. 4 was formed. The non-glass substrate was a HPL panel configured as described in Example 1. The glass sheet was a flexible aluminosilicate glass sheet as described in Example 1. The barrier film was a multi-layer barrier film including the following layers, in order from the outer surface toward the non-glass substrate: PET (12 μm), PE (20 μm), aluminum foil (6 μm), PE (20 μm), LLDPE (35 μm). The barrier film had a WVTR<0.1 g/m$^2$/day. Each of the glass sheet and the barrier film was laminated to the non-glass substrate with the adhesives described in Example 1.

Example 5

A glass laminate having the general configuration shown in FIG. 4 was formed. The non-glass substrate was a HPL panel configured as described in Example 1. The glass sheet was a flexible aluminosilicate glass sheet as described in Example 1. The barrier film was a multi-layer barrier film including the following layers, in order from the outer surface toward the non-glass substrate: Nylon (15 μm), aluminum foil (7 μm), PE (78 μm). The barrier film had a WVTR <0.1 g/m$^2$/day. Each of the glass sheet and the barrier film was laminated to the non-glass substrate with the adhesives described in Example 1.

Example 6

A glass laminate having the general configuration shown in FIG. 4 was formed. The non-glass substrate was a HPL panel configured as described in Example 1. The glass sheet was a flexible aluminosilicate glass sheet as described in Example 1. The barrier film was a multi-layer barrier film including the following layers, in order from the outer surface toward the non-glass substrate: Acryl coating, PE (38 μm), acryl coating, aluminum (40-80 nm). The barrier film had a WVTR of 1.5 g/m$^2$/day. Each of the glass sheet and the barrier film was laminated to the non-glass substrate with the adhesives described in Example 1.

Example 7

A glass laminate having the general configuration shown in FIG. 4 was formed. The non-glass substrate was a HPL panel configured as described in Example 1. The glass sheet was a flexible aluminosilicate glass sheet as described in Example 1. The barrier film was a multi-layer barrier film including the following layers, in order from the outer surface toward the non-glass substrate: PET (50 μm), aluminum foil (7 μm), PET (50 μm), an acrylic acrylate pressure sensitive adhesive (50 μm). The barrier film had a WVTR<0.05 g/m$^2$/day. The glass sheet was laminated to the non-glass substrate with the adhesive described in Example 1. The barrier film was laminated to the non-glass substrate with the acrylic acrylate pressure sensitive adhesive integrated in the barrier film.

Example 8

A glass laminate having the general configuration shown in FIG. 4 was formed. The non-glass substrate was a HPL panel configured as described in Example 1. The glass sheet was a flexible aluminosilicate glass sheet as described in Example 1. The barrier film was a multi-layer barrier film including the following layers, in order from the outer surface toward the non-glass substrate: PET (100 μm), silicon oxide (1 μm). The barrier film was transparent and had a WVTR of 0.01 g/m$^2$/day. Each of the glass sheet and the barrier film was laminated to the non-glass substrate with the adhesives described in Example 1.

Comparative Example 1

A glass laminate having the general configuration shown in FIG. 1 was formed. The non-glass substrate was a HPL panel without any embedded aluminum layers. The glass sheet was a flexible aluminosilicate glass sheet as described in Example 1. The glass laminate was free of a barrier film. The glass sheet was laminated to the non-glass substrate with the adhesive described in Example 1.

Comparative Example 2

A glass laminate having the general configuration shown in FIG. 1 was formed. The non-glass substrate was a HPL panel configured as described in Example 1. The glass sheet was a flexible aluminosilicate glass sheet as described in Example 1. The glass laminate was free of a barrier film. The glass sheet was laminated to the non-glass substrate with the adhesive described in Example 1.

Table 1 shows the flatness of various examples, comparative examples, and an HPL substrate without a glass sheet or barrier film laminated thereto determined according to European Standard EN 438 as manufactured and the change in flatness determined according to European Standard EN 438 upon exposure to 23° C. and 90% relative humidity for 7 days, compared to the flatness as manufactured. It should be noted that the flatness of "<−15" shown in Table 1 for Comparative Example 2 indicates that the sample exhibited a bow of more than 15 mm/m in the negative direction. Thus, the absolute value of the bow was greater than 15 mm/m.

TABLE 1

Flatness or change in flatness of glass laminates and HPL substrate.

| | Flatness or Change in Flatness (mm/m) | |
|---|---|---|
| | As Manufactured | 23° C., 90% RH, 7 days |
| Example 1 | +0.1 to +1.0 | −0.2 to −0.3 |
| Example 2 | +0.1 to +1.0 | 0.0 |
| Example 3 | +0.1 to +1.0 | 0.0 |
| Example 4 | +0.1 to +1.0 | +0.2 to +0.3 |
| Example 5 | +0.1 to +1.0 | +0.3 to +0.4 |
| Example 6 | +0.1 to +1.0 | −0.7 to −0.9 |
| Example 7 | +0.1 to +1.0 | +0.2 to +0.3 |
| Example 8 | +0.1 to +1.0 | +0.6 to +0.7 |
| HPL Substrate | 0.0 to +0.5 | −0.1 to +0.1 |
| Comp. Example 1 | +0.1 to +1.0 | −7.5 to −8.2 |
| Comp. Example 2 | +0.1 to +1.0 | <−15 |

As evidenced by the data shown in Table 1, the glass laminates of Examples 1-8 with barrier films laminated to the surface of the non-glass substrate opposite the glass sheet exhibit improved flatness compared to the glass laminate of Comparative Examples 1-2, which are free of a barrier layer.

Surprisingly, the glass laminates of Examples 1-8 with barrier films laminated to the surface of the non-glass substrate opposite the glass sheet exhibit improved flatness compared to the glass laminate of Comparative Example 2, even though the glass laminate of Comparative Example 2 includes aluminum layers embedded within the non-glass substrate. Without wishing to be bound by any theory, it is believed that even the small number of polymer impregnated papers (e.g., a phenol impregnated decorative layer and a melamine impregnated overlay) disposed between the aluminum layer and the outer surface of the glass laminate of Comparative Example 2 away from the glass sheet are capable of absorbing a sufficient amount of moisture to cause bowing of the glass laminate, even though the embedded aluminum layers may substantially prevent moisture from penetrating deeper within the non-glass substrate beyond the aluminum layer.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A method for forming a glass laminate, the method comprising:
   laminating a glass sheet to a first surface of a non-glass substrate;
   laminating a multi-layer barrier film to a second surface of the non-glass substrate with an adhesive comprising a thickness of at least about 5 μm, the multi-layer barrier film comprising a metal layer and a polymer layer,
   wherein the glass sheet comprises a thickness of at most 0.7 mm.

2. The method of claim 1, further comprising forming the non-glass substrate prior to each of the laminating the glass sheet and the laminating the multi-layer barrier film by pressing a stack of polymer impregnated papers to bond the polymer impregnated papers.

3. The method of claim 2, wherein the pressing the stack of polymer impregnated papers comprises a high pressure laminate (HPL) process or a low pressure laminate (LPL) process.

4. The method of claim 1, wherein subsequent to the laminating the multi-layer barrier film, a first surface of the multi-layer barrier film is adjacent to the non-glass substrate and a second surface of the multi-layer barrier film opposite the first surface defines an outer surface of the glass laminate.

5. The method of claim 1, wherein an absolute value of a flatness of the glass laminate determined according to European Standard EN 438 after exposure to 23° C. and 90% relative humidity for 7 days is at most about 3 mm/m.

6. A glass laminate comprising:
   a non-glass substrate comprising a first surface and a second surface opposite the first surface;
   a glass sheet laminated to the first surface of the non-glass substrate; and
   a multi-layer barrier film laminated to the second surface of the non-glass substrate with an adhesive comprising a thickness of at least about 5 μm, the multi-layer barrier film comprising a metal layer and a polymer layer,
   wherein the glass sheet comprises a thickness of at most 0.7 mm.

7. The glass laminate of claim 6, wherein the multi-layer barrier film comprises a first surface adjacent to the non-glass substrate and a second surface opposite the first surface of the multi-layer barrier film, wherein the second surface of the multi-layer barrier film defines an outer surface of the glass laminate.

8. The glass laminate of claim 6, wherein the metal layer has a thickness of about 20 nm to about 50 μm.

9. The glass laminate of claim 6, wherein the polymer layer comprises a plurality of polymer layers.

10. The glass laminate of claim 9, wherein the metal layer is disposed between two of the plurality of polymer layers.

11. The glass laminate of claim 6, wherein a thickness of said non-glass substrate is at least about 1 mm and at most 30 mm.

12. The glass laminate of claim 11, wherein the thickness of said non-glass substrate is greater than the glass sheet thickness.

13. The glass laminate of claim 12, wherein the multi-layer barrier film comprises a thickness of at most about 0.5 mm.

14. The glass laminate of claim 6, wherein an absolute value of a flatness of the glass laminate determined according to European Standard EN 438 after exposure to 23° C. and 90% relative humidity for 7 days is at most about 3 mm/m.

15. The glass laminate of claim 6, wherein the multi-layer barrier film comprises a water vapor transmission rate of at most about 2 $g/m^2/day$.

16. The glass laminate of claim 6, wherein the thickness of the glass sheet is at most about 0.3 mm.

17. A glass laminate comprising:
   a non-glass substrate comprising a first surface and a second surface opposite the first surface;
   a glass sheet laminated to the first surface of the non-glass substrate; and
   a barrier film laminated to the second surface of the non-glass substrate with an adhesive comprising a thickness of at least about 5 μm, the barrier film comprising a first surface adjacent to the non-glass substrate, a second surface opposite the first surface, and a thickness of at most about 0.5 mm;
   wherein the second surface of the barrier film defines an outer surface of the glass laminate,
   wherein the glass sheet comprises a thickness of at most 0.7 mm.

18. The glass laminate of claim 17, wherein the barrier film is a multi-layer barrier film comprising a metal layer and a polymer layer.

19. The glass laminate of claim 18, wherein the polymer layer comprises a plurality of polymer layers.

20. The glass laminate of claim 19, wherein the metal layer is disposed between two of the plurality of polymer layers.

* * * * *

UNITED STATES PATENT AND TRADEMARK OFFICE
CERTIFICATE OF CORRECTION

Page 1 of 1

PATENT NO. : 11,872,785 B2
APPLICATION NO. : 17/578556
DATED : January 16, 2024
INVENTOR(S) : Jhee-mann Kim et al.

It is certified that error appears in the above-identified patent and that said Letters Patent is hereby corrected as shown below:

On the Title Page

On the page 2, in Column 2, under "Other Publications", Line 5, delete "Patnet" and insert -- Patent --.

Signed and Sealed this
Twenty-fourth Day of December, 2024

Derrick Brent
*Acting Director of the United States Patent and Trademark Office*